United States Patent [19]
Timmermans

[11] 3,884,043
[45] May 20, 1975

[54] ARTIFICIAL ISLAND
[75] Inventor: Wilhelmus Jan Timmermans, Hellevoetsluis, Netherlands
[73] Assignee: R. J. Brown & Associates Corporation, Fribourg, Switzerland
[22] Filed: Jan. 16, 1974
[21] Appl. No.: 433,761

[30] Foreign Application Priority Data
Jan. 19, 1973 Netherlands...................... 7300821

[52] U.S. Cl. ...................... 61/72.3; 14/71; 114/231
[51] Int. Cl............................ F16l 1/00; B63b 35/04
[58] Field of Search ........... 61/72.3, 72.1; 114/43.5, 114/231, 2; 14/71

[56] References Cited
FOREIGN PATENTS OR APPLICATIONS
1,491,374   7/1967   France................................ 61/72.3

Primary Examiner—Jacob Shapiro
Attorney, Agent, or Firm—Young & Thompson

[57] ABSTRACT

An artificial island for laying pipeline and the like, has carriers that extend above the water line to support a platform. An elongated stinger for lowering pipeline is pivotally mounted at its upper end on a trolley that runs on the platform in the lengthwise direction of the stinger and is pivotally supported intermediate its ends by supporting rods that are pivoted to the island below the water line.

3 Claims, 2 Drawing Figures

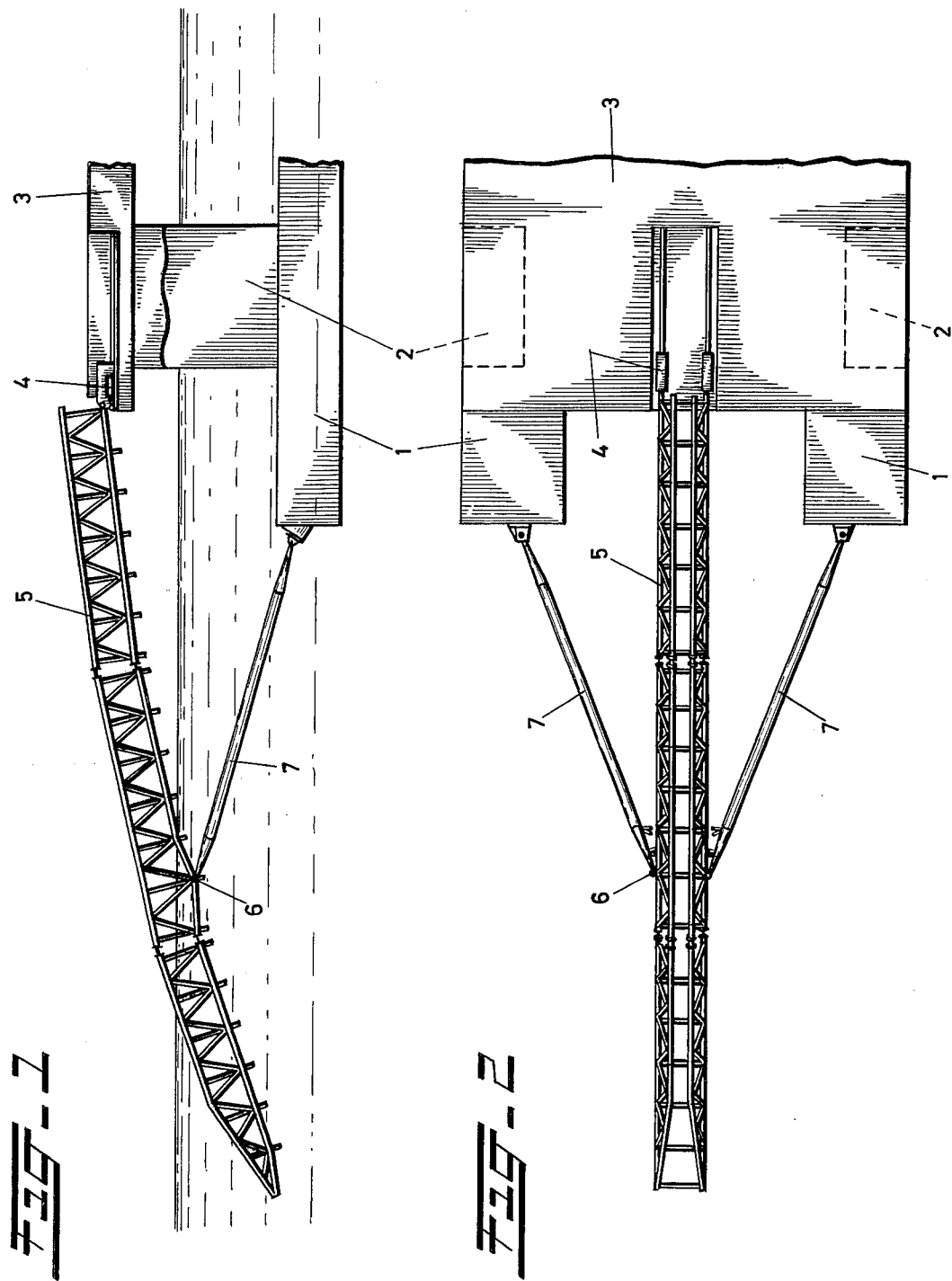

ARTIFICIAL ISLAND

The invention relates to an artificial island with carriers intersecting the waterline and a platform on these carriers. Similar artificial islands are known in many forms, such as floating islands with pontoon-like members, columns intersecting the waterline and a platform, islands standing upon the sea floor during operation and where the platform consists of a pontoon, movable along columns in a vertical direction, and islands consisting of a platform with fixed legs anchored to the sea bottom. Such artificial islands are used among others for exploration and exploitation of minerals. The minerals generally consist of natural gas or petroleum that has to be discharged via a pipeline.

For the laying of pipelines on the seabottom it is known to make use of specially equipped floating installations, on which the pipeline is being fabricated and then is lowered step by step. The part of the pipeline coming from the floating installation and going to the seabottom has an S-shaped configuration and it is essential to control the upper part of the curvature of this arc, in order that no impermissible stresses in the pipeline can develop. For that purpose such installations have a stinger, the curvature of which is in general adjustable, and with which the pipeline can still be supported over a considerable length at the aft end of the installation.

The invention now aims at making artificial islands also suitable for lowering a pipeline, in order to be able to work in this way under unfavourable conditions. However, if we provide an artificial island with such a stinger, than this will extend from the platform level, located high above the waterline, to a point far below the waterline and therefore be exposed to heavy loads under bad weather conditions.

In accordance with the invention this problem is now being solved, because the island is provided with a stinger employed for lowering a pipeline or such-like, which stinger with its upper end is connected to a guide member, movable over the platform from the edge inwards and vice versa, and between its ends via a support is coupled in a hinged mounting to a subaqueous part of the island. It is herewith attained that the stinger can be lifted completely out of the water by moving it with the guide member or over the guide member inwardly, by which the stinger swings up around the supporting rod and is moved at the same time inwardly so that the projecting length becomes smaller.

If repair work to the stinger is required, than it can be brought on the platform for the greater part of its length in the way described above, while the projecting part is easier accessible because it is then above the waterline.

The present invention will be further described with reference to the drawings.

FIG. 1 is a fragmentary side elevational view of subject invention and FIG. 2 is a top plan view thereof.

FIG. 1 shows a part of a floating artificial island with pontoonlike members 1, columns 2 and a platform 3. In an opening in the deck there is a trolley 4, which, by means not shown, for instance a hydraulic cylinder, can be moved inwardly from the position near the edge (as shown). To this trolley 4, with a hinged mounting a stinger 5 is attached, that can be constructed in a well known way and can consist of a plurality of tubular members coupled by hydraulic cylinders in such a way that the curvature of the stinger 5 can be set.

The stinger 5 is now at point 6 with a hinged mounting via a supporting rod 7 coupled to the pontoon-like members.

If the trolley 4 is now moved inwardly than the stinger 5, by means of supporting rods 7, which swing upwards, is lifted out of the water and consequently taken out of reach of the wave action.

This of course will take place after the pipeline on it is lowered under the waterline, which is also done on floating installations with which pipelines are laid when bad weather is expected.

I claim:

1. An artificial island with carriers intersecting the water line and a platform on said carriers, an elongated stinger for lowering a pipeline, one end of the stinger being connected to a guide member, means mounting said guide member for movement over the platform in the direction of the length of the stinger, a support connected to the stinger intermediate the ends of the stinger, the support being pivotally mounted on the island below the water line.

2. An artificial island as claimed in claim 1, said support comprising rod means pivotally connected at opposite ends to the stinger and to the island for vertical swinging movement of the stinger and rod means relative to the island.

3. An artificial island as claimed in claim 1, said guide member comprising a trolley movable horizontally on tracks on the platform.

* * * * *